United States Patent [19]

Robbins et al.

[11] Patent Number: 4,480,217

[45] Date of Patent: Oct. 30, 1984

[54] AUTOMATIC VELOCITY CALIBRATOR FOR A VELOCITY SERVO LOOP IN A MAGNETIC DISK DRIVE

[75] Inventors: David C. Robbins, Jefferson County; David Haldeman, Denver; John P. Hill, Adams County; Charles Sander; James Touchton, both of Boulder County, all of Colo.

[73] Assignee: Storage Technology Corporation, Louisville, Colo.

[21] Appl. No.: 449,735

[22] Filed: Dec. 14, 1982

[51] Int. Cl.³ .............................................. G05B 5/01
[52] U.S. Cl. .................................... 318/618; 318/561; 360/77
[58] Field of Search ............... 318/561, 615, 616, 617, 318/618; 360/77, 78

[56] References Cited

U.S. PATENT DOCUMENTS

| | | | |
|---|---|---|---|
| 3,699,555 | 10/1972 | Du Vall | 318/561 |
| 4,031,443 | 6/1977 | Droux | 318/561 |
| 4,134,053 | 1/1979 | Klinger | 318/561 |
| 4,166,970 | 9/1979 | Cardot et al. | 318/561 |
| 4,168,457 | 9/1979 | Rose | 318/561 |
| 4,200,827 | 4/1980 | Oswald | 318/561 |
| 4,321,517 | 3/1982 | Touchton et al. | 318/618 |
| 4,379,256 | 4/1983 | Maury | 318/561 |
| 4,383,207 | 5/1983 | Maury | 318/561 X |

Primary Examiner—B. Dobeck
Attorney, Agent, or Firm—Woodcock, Washburn, Kurtz, Mackiewicz & Norris

[57] ABSTRACT

An automatic velocity calibrator for a head positioning servo system in a magnetic disk drive performs a velocity calibration in a single pass over the magnetic disks by measuring actuator velocity and adjusting the gain of the velocity transducer in a series of successive approximations. Velocity is determined by turning a timer on in response to a track crossing and turning the timer off after at least two successive track crossings have been detected. A plurality of velocity measurements are stored and averaged. The average velocity is compared to a constant velocity command and an 8-bit latch is incremented or decremented in response to this comparison. A digital to analog converter produces a reference for an automatic gain control amplifier in the servo system which in turn adjusts the velocity transducer gain.

18 Claims, 4 Drawing Figures

AUTOMATIC VELOCITY CALIBRATOR FOR A VELOCITY SERVO LOOP IN A MAGNETIC DISK DRIVE

BACKGROUND OF THE INVENTION

This invention relates to an automatic velocity calibrator for a servo system controlling head positioning for magnetic disk drives and more particularly, to a technique which allows the calibration to be performed during the time that the disk drive is performing a rezero operation.

Large quantities of digital data are stored on rotating magnetic disks. A typical disk drive in which the present invention may be used, includes one or more magnetic disks which are stacked one atop another on a common shaft and rotated at a constant speed. Magnetic read/write heads, at least one for each side of each disk, are moved in and out radially with respect to the disk in response to the machine commands. The magnetic heads are mounted on a common carriage assembly, which is driven by an actuator. A position signal specifying the relative position of the heads to the tracks is generated by a head which reads servo encoded information on a disk. In order to accurately position the heads with respect to the tracks, an accurate servo system is required. One commonly used type of servo system responds to commands which specify the velocity of the actuator and the driven carriage. The actual velocity of this carriage is sensed and compared to the specified velocity in the servo system. U.S. Pat. No. 4,321,517—Touchton and Hill shows an example of a servo system for a magnetic disk drive in which requested velocity is compared to carriage velocity in a servo system.

In such servo systems, it is necessary to calibrate the system to assure that the requested velocity is being produced. The response of a servo system to a given velocity command is affected by component aging, temperature and other environmental factors as well as being different from machine to machine. Therefore, calibration is required.

The prior art calibration techniques have not been completely satisfactory. Typically, calibration is performed only at startup of the machine. For example, the ISS/Univac model 7350 disk drive requires repeated seeks of the servo system during calibration. It is feasible to perform these only during an extended interval, such as at startup.

Most magnetic disk storage systems have an operation which is referred to as a "rezero". At startup or when an access error occurs, the data heads must be placed at a known position on the disk. This operation is commonly referred to as a "rezero" because the heads are placed over cylinder 0 on the disks. A servo error can occur because the servo is out of calibration. It would be desirable to calibrate the servo system during the rezero operation, which is normally done as part of the error recovery process, to prevent non-recoverable errors due to the system being out of calibration.

It is an object of the present invention to provide a calibrator and a calibration method which can be performed during a single pass of the magnetic heads over the disk to allow it to be performed during a rezero operation without extending the time required for servo error recovery.

SUMMARY OF THE INVENTION

In accordance with the present invention, a velocity servo loop for a magnetic disk drive is calibrated by measuring the average velocity of the actuator between tracks and comparing this measured velocity to a constant velocity command. The gain of the velocity transducer is changed in response to this comparison. This is repeated as the actuator moves across successive tracks on the disks to calibrate the actuator velocity to the commanded velocity by successive approximations. By use of the invention, the gain of the velocity transducer, including the tachometer, is automatically adjusted in one pass of the heads over the disks and at a known radius within an acceptable radius tolerance. The transducer gain changes as a function of radius due to magnetic effects. It is important that the transducer gain, including the tachometer, be adjusted at a known radius to ensure proper performance over the entire operational radius range.

In accordance with another aspect of the present invention, a timer is started and stopped by the output of a track crossing detector. In accordance with the invention, the timer is stopped only after the detection of a multiple of two track crossings. By using an even number of track samples, discrepancies caused by track pairing problems are solved. Servo encoded disks usually have odd bands and even bands. The track crossing occurs when a head crosses the boundary between an odd and an even band. If every track crossing were used in the detection, there could be an apparently different distance from odd to even bands, than from even to odd bands due to magnetization sensitivity. Consequently velocity would not be accurately measured. The present invention obviates this problem.

Similarly, there is a problem with timer resolution if velocity is measured between only two track crossings. The present invention solves this problem by averaging multiple determinations of velocity. In an exemplary embodiment, eight velocity measurements are averaged.

Because the present invention automatically performs a calibration in a very short time, it is possible to carry out the calibration during time normally allotted for a rezero operation. This provides recalibration of the servo system during error recovery and improved reliability of the disk drive servo.

The foregoing and other objects, features and advantages of the invention will be better understood from the following more detailed description and appended claims.

SHORT DESCRIPTION OF THE DRAWINGS

DESCRIPTION OF THE PREFERRED EMBODIMENT

Figure 1:
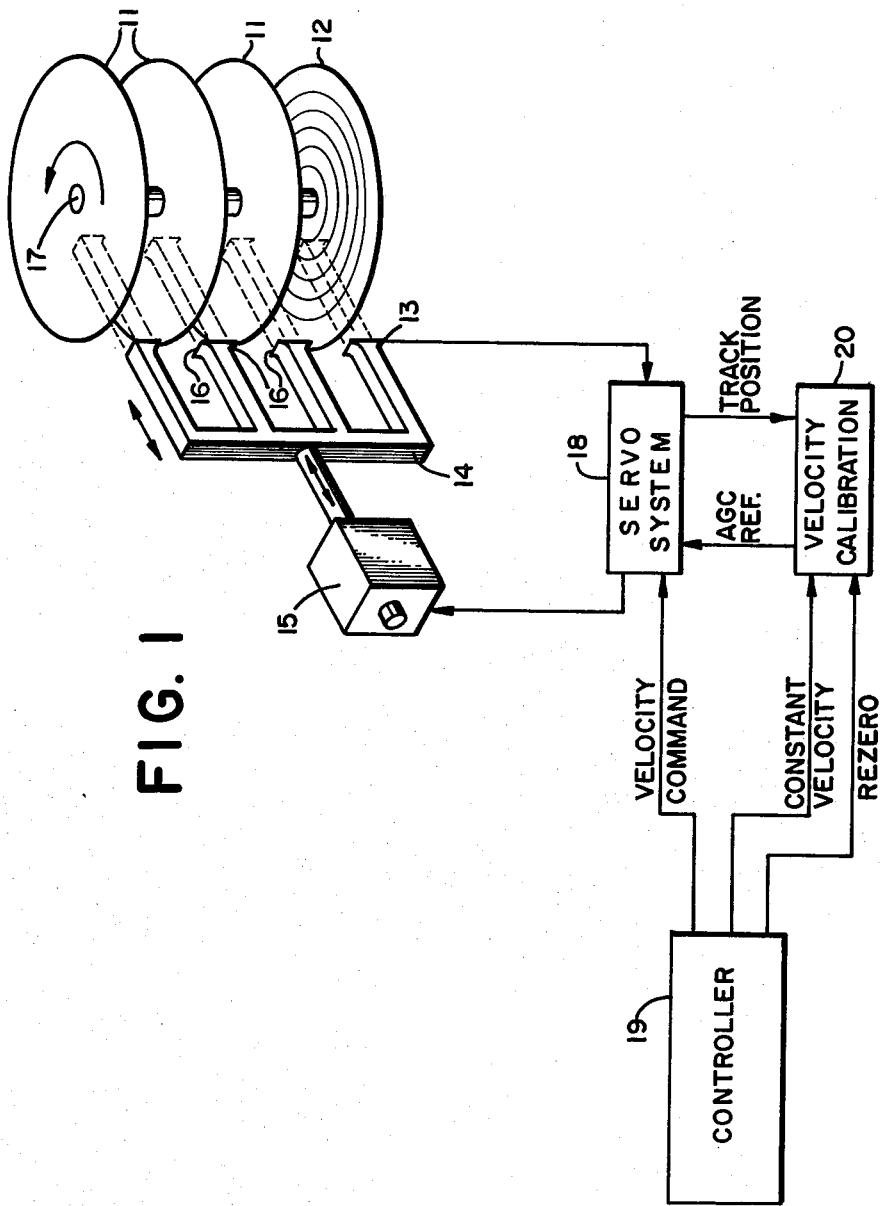
FIG. 1 depicts a magnetic disk drive of the type to which the present invention is applicable.

Referring now to FIG. 1, a schematic view of a magnetic data storage system according to the invention is shown. A plurality of magnetic disks 11 are shown mounted on a single spindle rotated in common along with a disk 12 which provides position sensing information. This position information, which may simply comprise a circular magnetic track, is picked up by a magnetic head 13 mounted for radial movement by head arm assembly and carriage 14. The head arm assembly 14 is driven back and forth by an actuator 15 with respect to the disks 11 and 12. As shown in FIG. 1, the actuator in the preferred embodiment is a voice-coil motor, but any sort of motor could be used.

Also mounted on the arm assembly are a plurality of magnetic read/write heads 16 which are adapted to detect data written onto the disks 11 or to write similar data onto the disks when commanded to do so. The magnetic heads move back and forth with respect to the spindle 17 on which the disks 11 are mounted in order to access substantially their entire surface area. The more accurately the actuator 5 can control the position of the magnetic head 16, the more information can be written on each of the disks 11 which has obvious economic and access-time advantages. In order to position the heads on the disks, a servo system 18 responds to position information from the head 13, and to commands from controller 19 to drive actuator 15. The servo system on which the present invention is an improvement, is of the type which senses the velocity of the heads and compares it to a velocity command to produce an error signal for driving the actuator. In accordance with the present invention, velocity calibration circuitry 20 is provided for the servo system to recalibrate the system each time that a rezero operation is performed.

Figure 2:
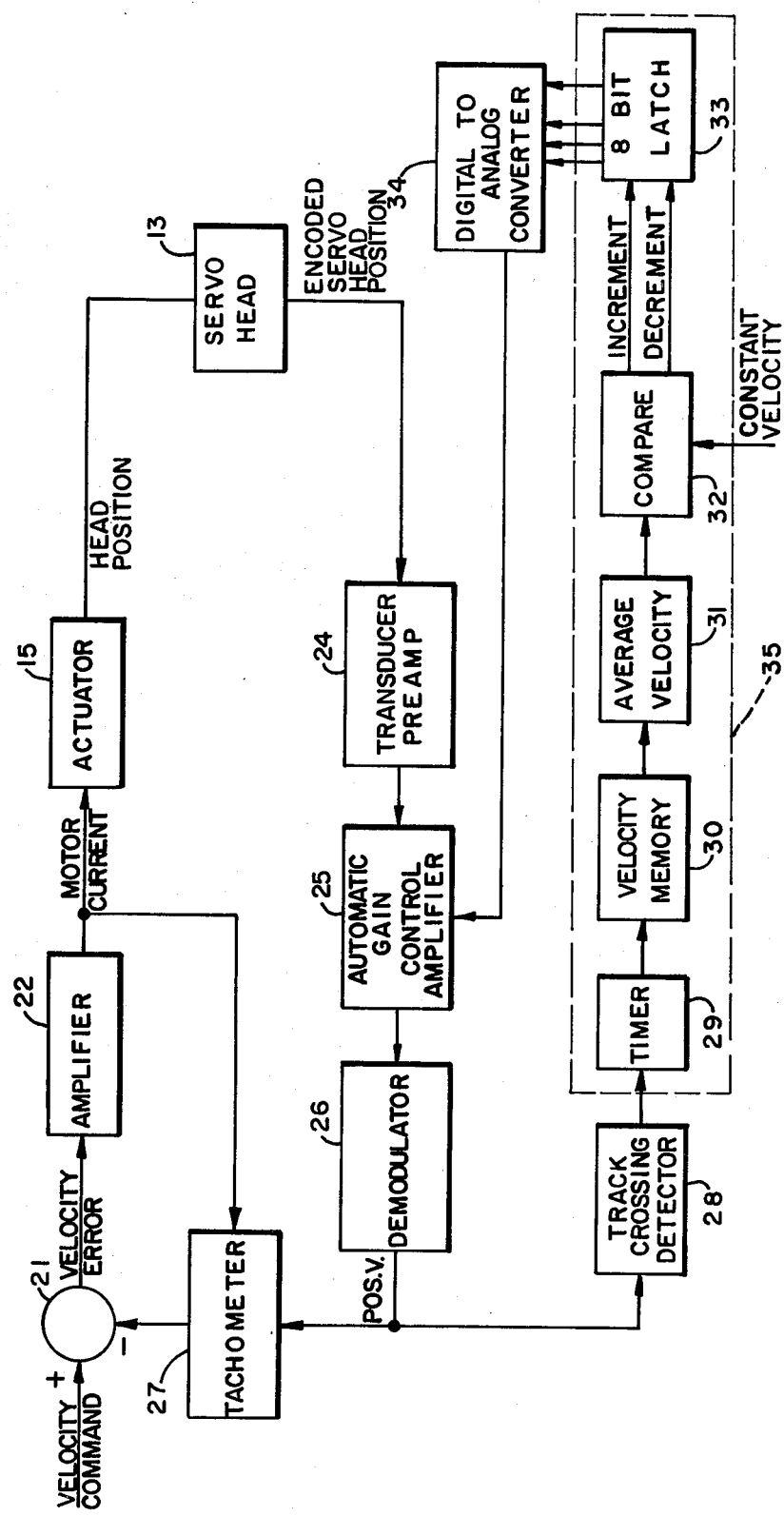
FIG. 2 shows the servo system and the calibrator of the present invention.

The servo system is shown in FIG. 2 wherein the requested velocity command, arriving at the left of the drawing from the controller, is a voltage proportional to a chosen velocity. This command is compared to the measured velocity at a summation node 21. A velocity error signal is produced at the node 21 which is proportional to the difference between the requested velocity and the measured velocity, i.e., the two voltages may be compared by a difference amplifier circuit. The error signal is passed to the amplifier 22 which modifies the magnitude and phase of the velocity error as a function of frequency, and converts a small voltage to a large current capable of driving the actuator 15.

An encoded signal from head 13 is amplified in the amplifier 24 and applied to the automatic gain control amplifier 25. This signal is converted to a voltage proportional to position in the demodulator 26. The position voltage, along with a voltage proportional to motor current, is applied to tachometer 27 to produce a voltage accurately proportional to velocity. This is applied to the summing node 21 to complete the servo loop. A more detailed description of a typical velocity servo system of this type is described in U.S. Pat. No. 4,321,517—Touchton and Hill. The circuits from the servo head 13 through the tachometer 27 are referred to as the velocity transducer, the gain of which can be changed by amplifier 25. In accordance with the present invention, a velocity calibration circuit is provided to adjust the reference applied to the automatic gain control amplifier 25.

Track crossing detector 28 produces an output each time the heads cross a track on the magnetic disks. The output of the track crossing detector is used to start and stop timer 29. The timer 29 is preset and is allowed to run until the track crossing detector 28 changes states twice, indicating two track crossing. Other multiples of two track crossings may be used. The value of the timer 29 is then read and stored in memory 30. This value represents an accurate measurement of the time required for the arm assembly to move the distance of two tracks. This process is repeated eight times, and all eight measurements are averaged as indicated at 31 for added accuracy. The measurement and determination of an average velocity requires the movement of the arm assembly over sixteen tracks on the disks.

As indicated at 32, a constant velocity command is compared with the average velocity which was measured using track crossing information. If the actual velocity is not the commanded velocity, an 8-bit latch 33 is incremented or decremented. The output of the 8-bit latch 33 is applied to digital to analog converter 34 which produces a reference current for the automatic gain control amplifier 25. It changes the gain of the amplifier to compensate for variations in transducer gain associated with the distribution of servo heads and disks, as well as other system parameters.

In practice, the circuits indicated at 29–33 are part of a microprocessor system 35 which, as an example, may be a Motorola 6801 based system.

The operation is as follows. A rezero operation is initiated by a command from the disk controller. Starting from the outer perimeter of the disk, the microprocessor 35 calibrates the servo using successive approximations. The velocity is adjusted to within 2% of the desired velocity at a known radius on the disk, in this case, the center of the stroke. Once the servo is calibrated, the microprocessor 35 positions the heads over track 0, completing the calibration and rezero. The foregoing is shown in more detail in the flow diagram which includes FIGS. 3A–3D.

Referring to 3A, the routine is started by a rezero command which is generated when there is an access error, during initial power up, or when a system rezero is commanded.

Step 40 determines if the heads are over guard band 2. If they are not, the heads are moved out as indicated at 41 until they are.

There are three guard bond zones on the disk. The zone nearest the inner radius of the disk is guard band 3. Moving outward, the next zone just outside the data zone is the guard band 1 zone. The one nearest the outer radius is the guard band 2 zone. During a rezero, the carriage will go back out across the guard band 1 zone, until it is over the guard band 2 zone. Then it will come back across the guard band 1 zone. The first track crossing in the data zone is track zero. This sequence determines where the carriage is initially on the disk, and its future locations are determined by counting track crossings. If it is in any area other than the guard band, it is moved at a fast velocity, step 41, to minimize time. If it is in guard band 1, it moves at a slow velocity, step 42. After a 1 millisecond delay, indicated at 43, a gain is set into the 8-bit latch which has an initial value of 40 in hexadecimal notation (40 hex). This step is indicated at 44.

Figure 3A:
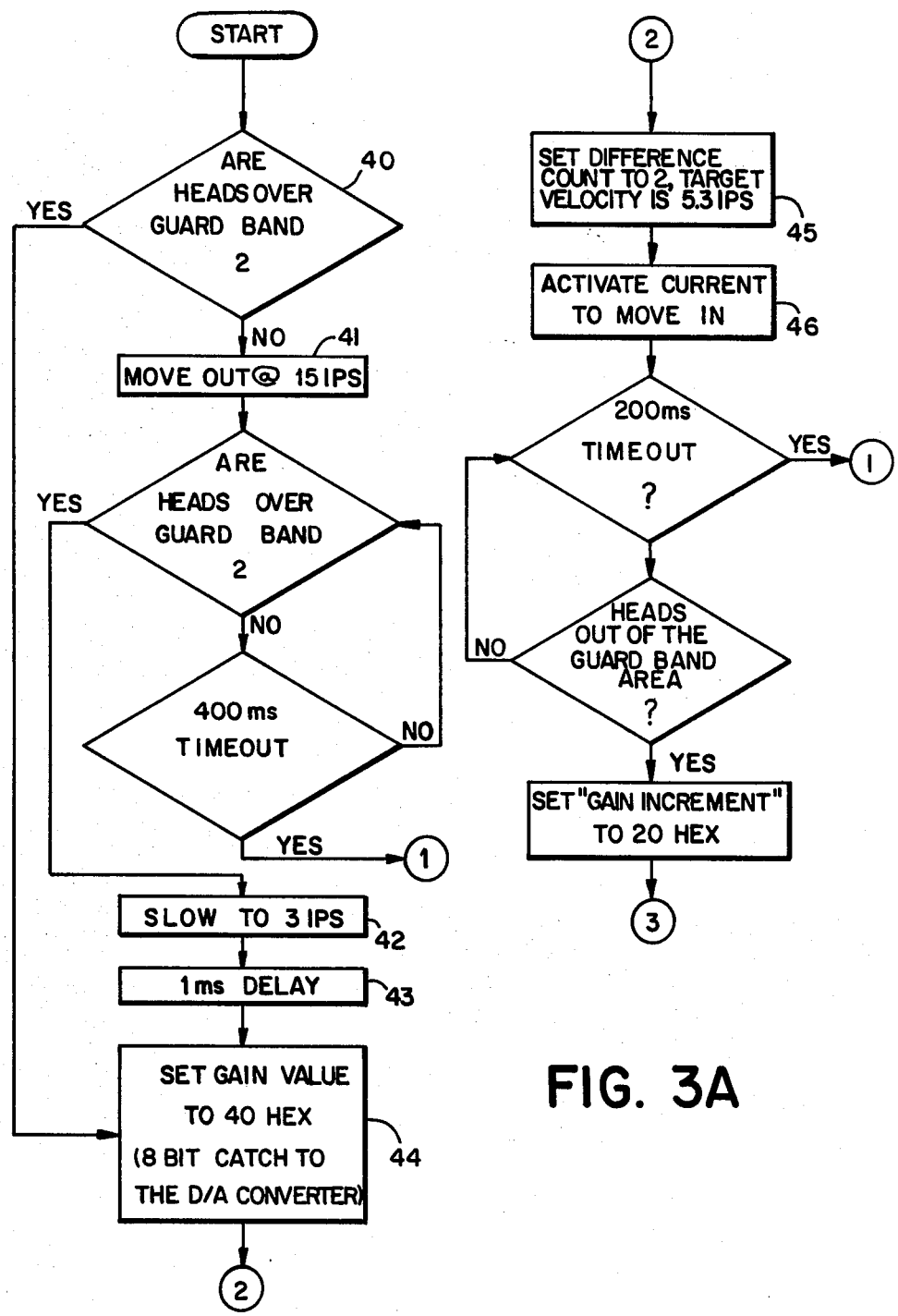
FIGS. 3A–3B are a flowchart showing the operation of the microprocessor in performing the invention.
Figure 3B:
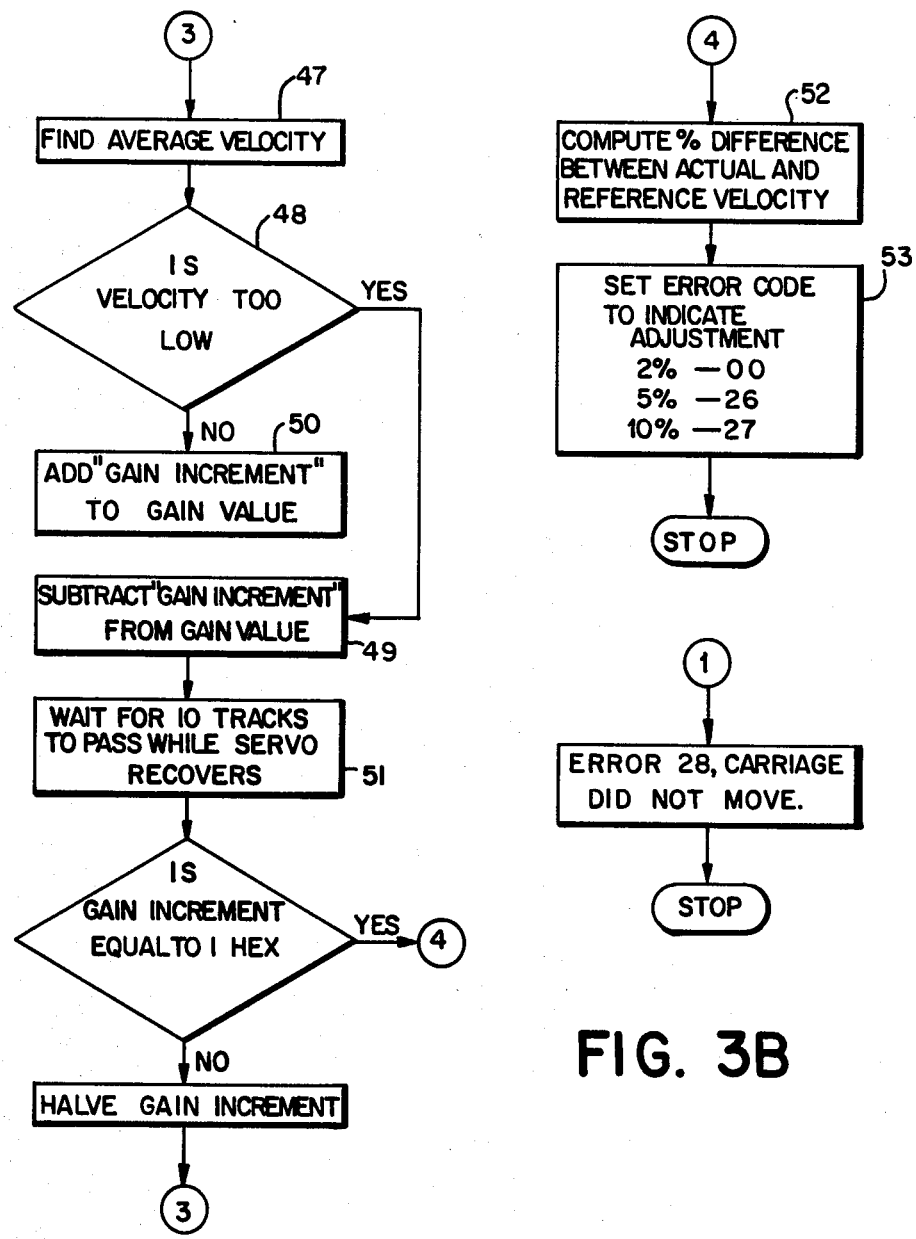

As indicated at 45 in FIG. 3A, the constant velocity command which is the target velocity in this example, is 5.3" per second. Drive current is supplied to the actuator to move it toward the center of the disk as indicated at 46. As soon as the heads are out of the guard band, the average velocity is determined as indicated at 47 (FIG. 3B). A comparison is made to the constant velocity command as indicated at 48. If the velocity is too low, the gain increment ($20_{Hex}$ initially) is subtracted from the gain value as indicated at 49. If it is too high, the gain increment is added to the gain value as indicated at 50. Ten tracks are passed while the servo responds to the new change in servo gain, as indicated in 51.

This process is repeated with the gain increment being halved each pass until the gain value is changed by 1. After completion the actual velocity of the carriage is compared with the reference velocity and the % difference computed as indicated in 52. The proper error code is then set according to the previous result as indicated in 53.

While a particular embodiment of the invention has been shown and described, various modifications are within the true spirit and scope of the invention. The appended claims are, therefore, intended to cover all such modifications.

What is claimed is:

1. In a magnetic disk drive of the type in which magnetic heads are positioned over tracks on magnetic disks by an actuator driven by a servo loop responsive to a velocity transducer and to a velocity command to produce a velocity error signal, an automatic velocity calibrator for said servo loop comprising:
   means for measuring the velocity of said actuator between at least two tracks on one of said disks;
   means for comparing the measured velocity to a constant velocity command;
   means for changing the gain of said velocity transducer in response to the comparison; and
   means for successively actuating said means for measuring, comparing and changing the gain of said velocity transducer as said actuator moves across successive tracks on said disks to calibrate said actuator velocity in a single pass of said heads across said tracks.

2. The automatic velocity calibrator recited in claim 1 wherein means for causing said actuator velocity is calibrated with said heads at a known radius of said disk.

3. The automatic velocity calibrator recited in claim 2 wherein said means for successively actuating calibrates said actuator velocity by successive approximations which converge at said known radius.

4. The automatic velocity calibrator recited in claim 1 wherein said means for changing the gain of said velocity transducer includes a multiple bit latch which is incremented and decremented in response to said comparison, said multiple bit latch being connected to change the gain of said velocity transducer.

5. The automatic velocity calibrator recited in claim 4 wherein said velocity transducer includes a gain control amplifier, said calibrator further comprising:
   a digital to analog converter connected between said multiple bit latch and said gain control amplifier to change the reference supplied thereto.

6. The automatic velocity calibrator recited in claim 1 wherein said calibrator is operated in response to an automatic rezero signal from a controller for said disk drive.

7. The automatic velocity calibrator recited in claim 1 wherein said means for measuring comprises:
   a track crossing detector;
   a timer started and stopped by said detector; and
   means for storing the value of said timer as a measure of actuator velocity.

8. The automatic velocity calibrator recited in claim 7 further comprising:
   means for averaging a plurality of stored values of actuator velocity.

9. The automatic velocity calibrator recited in claim 7 wherein said timer is stopped upon the crossing of a multiple of two tracks after said timer is started.

10. The automatic velocity calibrator recited in claim 7 wherein said timer and said means for storing comprise a microprocessor.

11. The automatic velocity calibrator recited in claim 8 wherein said means for averaging comprises a microprocessor.

12. The method of calibrating a velocity servo transducer for a magnetic disk drive of the type in which magnetic heads are positioned over tracks on magnetic disks by an actuator driven by said servo transducer comprising:
   measuring the velocity of said actuator between a multiple of two tracks on one of said disks;
   comparing the measured velocity to a constant velocity command;
   changing the velocity transducer in response to the comparison; and
   successively performing the steps of measuring, comparing and changing said velocity transducer gain as said actuator moves across successive tracks on said disks to calibrate said actuator velocity to said constant velocity command by successive approximations.

13. The method recited in claim 12 wherein the step of measuring includes:
   counting time intervals between track crossings of said actuator across said disk; and
   storing the counted time intervals as a measure of actuator velocity.

14. The method recited in claim 13 further comprising:
   averaging a plurality of stored values of actuator velocity.

15. The method recited in claim 13 further comprising:
   stopping said counting after the crossing of at least two tracks after said counting is started.

16. The method recited in claim 12 performed during the time that the operation of said disk drive is interrupted for a rezero operation.

17. The method recited in claim 12 performed during one pass of said actuator over said disks.

18. The method recited in claim 12 performed with said heads at a known radius of said disk.

* * * * *